US008581594B2

(12) United States Patent
Wang et al.

(10) Patent No.: US 8,581,594 B2
(45) Date of Patent: *Nov. 12, 2013

(54) MICRORESISTIVITY ANISOTROPY LOGGING TOOL EMPLOYING A MONOPOLE CURRENT INJECTION ELECTRODE

(75) Inventors: Tsili Wang, Katy, TX (US); Christopher C Streinz, Hersey, ME (US)

(73) Assignee: Schlumberger Technology Corporation, Sugar Land, TX (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/649,930

(22) Filed: Dec. 30, 2009

(65) Prior Publication Data

US 2011/0156709 A1    Jun. 30, 2011

(51) Int. Cl.
G01V 3/00    (2006.01)
E21B 47/00   (2012.01)

(52) U.S. Cl.
USPC .............................. 324/366; 324/371; 175/50

(58) Field of Classification Search
USPC .................................... 324/366–375; 175/50
See application file for complete search history.

(56) References Cited

U.S. PATENT DOCUMENTS

| | | | |
|---|---|---|---|
| 4,594,552 A | | 6/1986 | Grimaldi et al. |
| 4,968,940 A | * | 11/1990 | Clark et al. ............... 324/338 |
| 5,103,920 A | * | 4/1992 | Patton ........................ 175/45 |
| 5,235,285 A | | 8/1993 | Clark et al. |
| 5,339,037 A | | 8/1994 | Bonner et al. |
| 5,473,158 A | | 12/1995 | Holenka et al. |
| 5,510,712 A | * | 4/1996 | Sezginer et al. ............ 324/368 |
| 6,061,634 A | * | 5/2000 | Belani et al. .................. 702/12 |
| 6,173,793 B1 | | 1/2001 | Thompson et al. |
| 6,191,588 B1 | | 2/2001 | Chen |
| 6,359,438 B1 | | 3/2002 | Bittar |
| 6,373,254 B1 | | 4/2002 | Dion et al. |
| 6,600,321 B2 | | 7/2003 | Evans |
| 6,714,014 B2 | | 3/2004 | Evans et al. |
| 6,765,386 B2 | | 7/2004 | Gianzero et al. |
| 6,891,377 B2 | | 5/2005 | Cheung et al. |
| 6,985,086 B2 | * | 1/2006 | Tang et al. ............... 340/854.4 |
| 7,027,926 B2 | | 4/2006 | Haugland |
| 7,046,010 B2 | | 5/2006 | Hu et al. |
| 7,066,282 B2 | | 6/2006 | Chen et al. |
| 7,098,664 B2 | | 8/2006 | Bittar et al. |
| 7,098,667 B2 | * | 8/2006 | Liu ................................. 324/460 |
| 7,242,194 B2 | | 7/2007 | Hayman et al. |
| 7,250,768 B2 | | 7/2007 | Ritter et al. |
| 7,265,553 B2 | | 9/2007 | Cheung et al. |
| 7,284,605 B2 | | 10/2007 | Clark et al. |

(Continued)

OTHER PUBLICATIONS

International Search Report for International Application No. PCT/US2010/061471 dated Jul. 28, 2011.

*Primary Examiner* — Joshua Benitez Rosario
(74) *Attorney, Agent, or Firm* — Christopher Streinz; Kimberly Ballew

(57) ABSTRACT

A microresistivity logging tool includes a monopole current injection electrode and at least first and second pairs of potential electrodes. The tool may further include a controller configured for making microresistivity anisotropy measurements using a single firing of the monopole current injection electrode. The controller may be configured to compute a two-dimensional tensor of the local formation resistivity from a single firing of the monopole current injection electrode. The use of a single firing tends to decrease measurement time, which in turn tends to improved azimuthal sensitivity in microresistivity anisotropy imaging while drilling applications.

23 Claims, 5 Drawing Sheets

(56) References Cited

U.S. PATENT DOCUMENTS

| | | |
|---|---|---|
| 7,340,384 B2 * | 3/2008 | Delhomme et al. ............ 703/10 |
| 7,385,401 B2 | 6/2008 | Itskovich et al. |
| 7,545,145 B2 | 6/2009 | Wang |
| 7,558,675 B2 | 7/2009 | Sugiura |
| 7,609,066 B2 | 10/2009 | Wang |
| 8,305,083 B2 * | 11/2012 | Wang ............................ 324/369 |
| 8,319,498 B2 * | 11/2012 | Wang ............................ 324/369 |
| 8,362,781 B2 * | 1/2013 | Reiderman ................... 324/346 |
| 8,390,295 B2 * | 3/2013 | Gorek et al. ................... 324/373 |
| 2007/0103161 A1 * | 5/2007 | San Martin et al. .......... 324/366 |
| 2008/0128166 A1 | 6/2008 | Forgang et al. |
| 2008/0143336 A1 * | 6/2008 | Legendre et al. ............. 324/339 |
| 2008/0303525 A1 | 12/2008 | Itskovich |
| 2008/0315884 A1 * | 12/2008 | Bittar et al. ................... 324/366 |
| 2009/0085570 A1 | 4/2009 | Signorelli et al. |
| 2009/0224766 A1 * | 9/2009 | Wang et al. ................... 324/366 |
| 2009/0243619 A1 | 10/2009 | Bespalov |
| 2011/0156711 A1 | 6/2011 | Wang |

\* cited by examiner

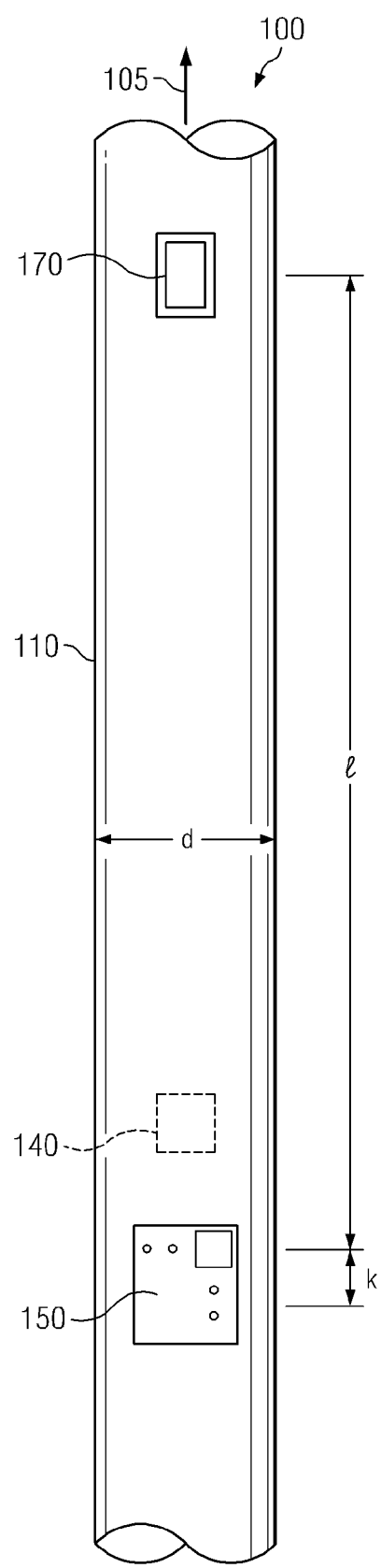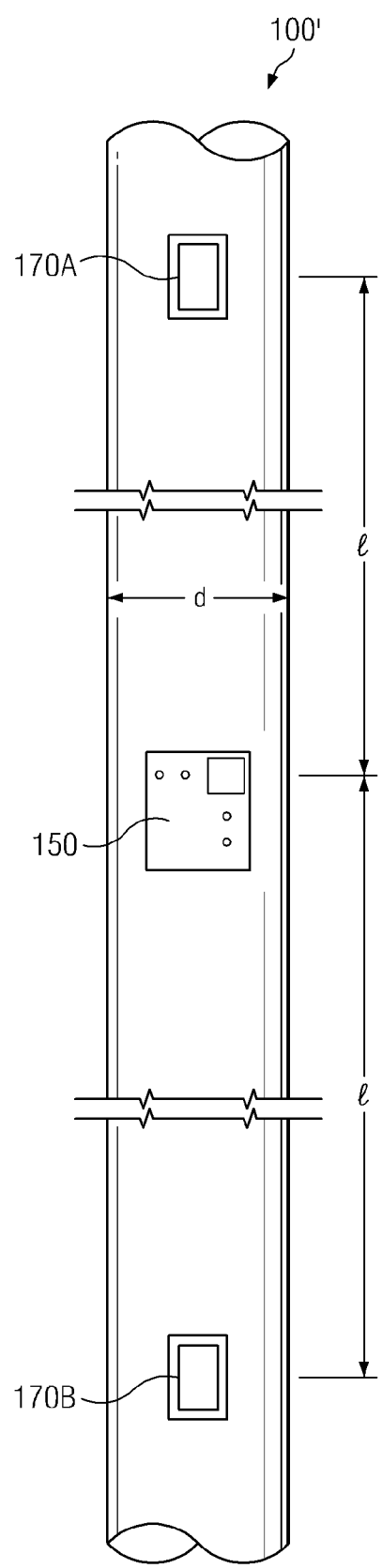
FIG. 2
FIG. 6

MICRORESISTIVITY ANISOTROPY LOGGING TOOL EMPLOYING A MONOPOLE CURRENT INJECTION ELECTRODE

RELATED APPLICATIONS

None.

FIELD OF THE INVENTION

The present invention relates generally to microresistivity logging measurements. More particularly, embodiments of this invention relate to a logging tool configured for making microresistivity anisotropy measurements.

BACKGROUND OF THE INVENTION

The use of electrical measurements in prior art downhole applications, such as logging while drilling (LWD) and wireline logging applications, is well known. Such techniques may be utilized to determine a subterranean formation resistivity, which, along with formation porosity measurements, may be used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Techniques for making microresistivity measurements of a subterranean formation are well known in the prior art for both wireline and LWD operations. For example, microresistivity sensors configured for use with non-conductive drilling fluid commonly include at least one pair of potential electrodes deployed between a current injection electrode and a corresponding current return electrode. In use, alternating current is passed between the injector and return electrodes and the potential difference (voltage drop) between the potential electrodes is measured. The formation resistivity in the region of the potential electrodes may then be calculated from the measured potential difference. Those of ordinary skill will appreciate that the formation resistivity tends to be approximately proportional to the measured potential difference.

Techniques for making microresistivity anisotropy measurements are also known in the art. For example, U.S. Pat. No. 6,765,386 to Gianzero et al discloses a logging tool including first and second current injection electrodes. The first current injection electrode is vertically spaced apart from a corresponding return electrode and is configured to induce a vertical current. The second current injection electrode is horizontally spaced apart from a corresponding return electrode and is configured to induce a horizontal current. The tool further includes multiple pairs of potential electrodes deployed between the current injection and return electrodes. In use, current is first applied between the first pair of current electrodes and then later applied between the second pair of current electrodes to obtain microresistivity measurements.

While such measurement techniques may be suitable for making microresistivity anisotropy measurements, there is yet room for further improvement, in particular for making azimuthally resolved microresistivity anisotropy measurements during LWD imaging applications.

SUMMARY OF THE INVENTION

Aspects of the present invention are intended to address the above described need for an improved apparatus and method for making microresistivity anisotropy measurements. In one exemplary embodiment of the invention, a microresistivity logging tool includes a sensor having a monopole current injection electrode and at least first and second pairs of potential electrodes. The tool may further include a controller configured for making microresistivity anisotropy measurements using a single firing of the monopole current injection electrode. The controller may further be configured to compute a two-dimensional tensor of the local formation resistivity. Methods for making such two-dimensional tensor measurements are also disclosed.

Exemplary embodiments of the present invention may advantageously provide several technical advantages. Exemplary embodiments of the invention enable microresistivity anisotropy measurements to be acquired. For example, one exemplary embodiment of the invention enables a two-dimensional resistivity tensor to be computed from potential measurements corresponding to a single firing of the monopole current injection electrode. This tends to improve measurement accuracy and also preserves limited downhole power. The use of a single firing of the current injection electrode further decreases the measurement time, which in turn tends to improved azimuthal sensitivity.

Tool embodiments in accordance with the invention may also employ a remote return electrode (e.g., located at a practical electrical infinity with respect to the current injection electrode). The use of a remote return electrode tends to eliminate biases to the potential measurement caused by heterogeneities near the return electrode. The resulting measurement may thus be made sensitive only to the formation volume immediately around the injection electrode, which tends to improve the accuracy and reliability of the above described tensor measurements.

In one aspect the present invention includes downhole microresistivity logging tool. The tool includes a monopole current injection electrode deployed on a logging tool body and configured to inject alternating electrical current into a formation. The tool further includes a first pair of potential electrodes spaced apart from the current injection electrode in a first direction and a second pair of potential electrodes spaced apart from the current injection electrode in a second direction. A controller is configured to (i) apply an alternating current between the monopole current injection electrode and a return and (ii) measure first and second potential differences between the corresponding first and second pairs of potential electrodes.

In another aspect, the present invention includes a downhole microresistivity logging tool. The tool includes a monopole current injection electrode deployed on a logging tool body and configured to inject alternating electrical current into a formation. The tool further includes first and second arrays of potential electrodes. The first array is spaced apart from the current injection electrode in a first direction and includes at least first and second pairs of potential electrodes, the first pair of potential electrodes being spaced apart from one another in the first direction and the second pair of potential electrodes being spaced apart from one another in the second direction. The second array of potential electrodes is spaced apart from the current injection electrode in the second direction and includes at least third and fourth pairs of potential electrodes, the third pair of potential electrodes being spaced apart from one another in the first direction and the fourth pair of potential electrodes being spaced apart from one another in the second direction. A controller is configured to (i) apply an alternating current between the current injection electrode and a return and (ii) substantially simultaneously make first, second, third, and fourth AC voltage measurements using the corresponding first, second, third, and fourth pairs of potential electrodes.

In still another aspect, the present invention includes a method for making microresistivity anisotropy logging measurements. A microresistivity logging tool is deployed in a borehole. The logging tool includes a monopole current injection electrode and at least first and second pairs of potential electrodes, the first pair of potential electrodes being spaced apart from the current injection electrode in a first direction and the second pair of potential electrodes being spaced apart from the current injection electrode in a second direction. An alternating electrical current is injected into a subterranean formation at the monopole current injection electrode and first and second AC potentials are measured between the corresponding first and second pairs of potential electrodes. First and second resistivity values are computed using the corresponding first and second measured AC potentials.

In yet another aspect, the present invention includes a method for making microresistivity anisotropy logging measurements. A microresistivity logging tool is deployed in a borehole. The logging tool includes a monopole current injection electrode and at least first, second, third, and fourth pairs of potential electrodes, the first and second pairs of potential electrodes being spaced apart from the current injection electrode in a first direction and the third and fourth pairs of potential electrodes being spaced apart from the current injection electrode in a second direction. An alternating electrical current is injected into a subterranean formation at the monopole current injection electrode and first, second, third, and fourth AC potentials are measured between the corresponding first, second, third, and fourth pairs of potential electrodes. The measured potentials are processed to obtain a voltage tensor, which is in turn utilized to compute a resistivity tensor.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 depicts one exemplary embodiment of a microresistivity logging tool in accordance with the present invention.

FIG. 6 depicts an alternative embodiment of a microresistivity logging tool in accordance with the present invention.

DETAILED DESCRIPTION

Figure 1:
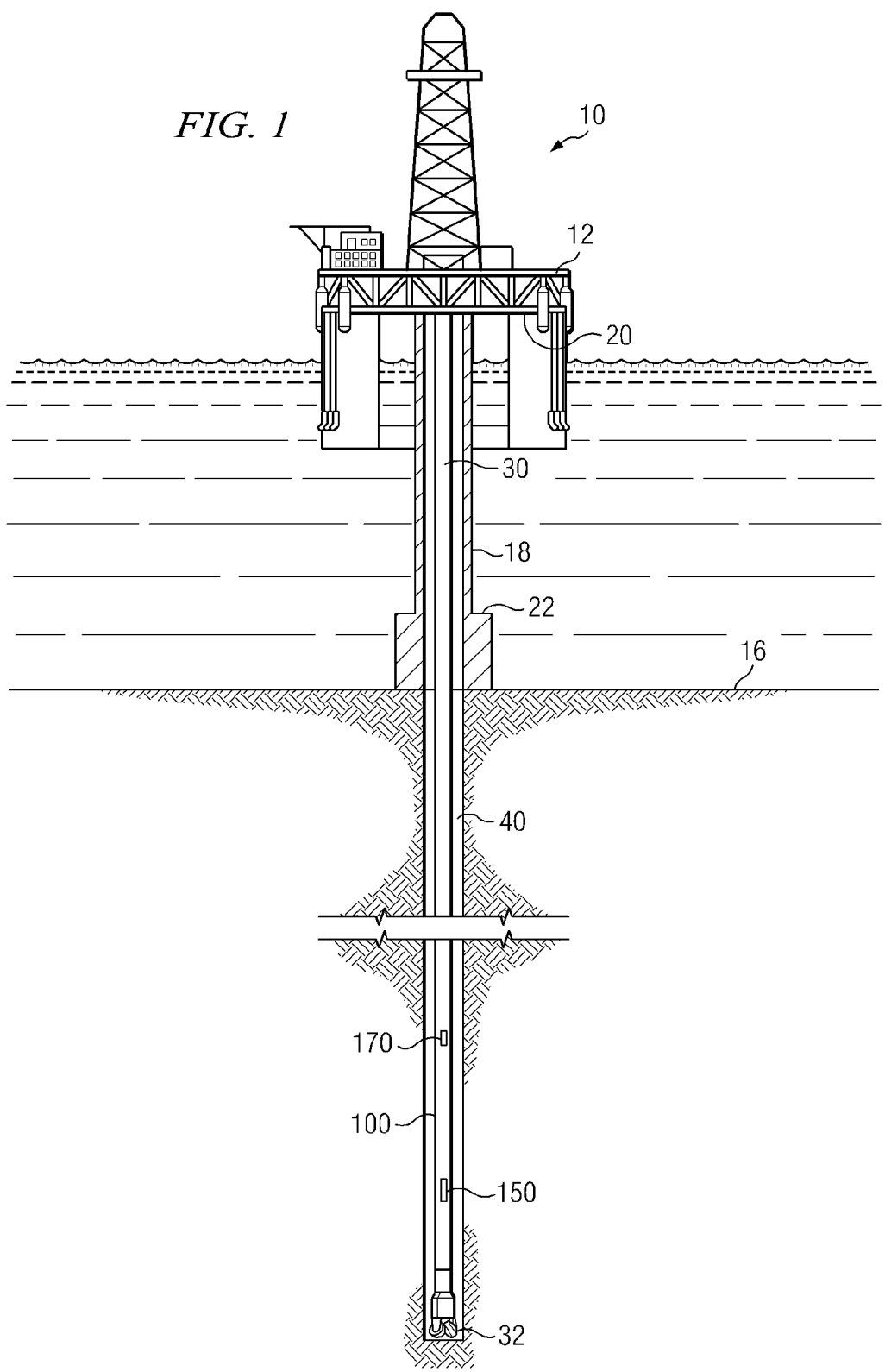
FIG. 1 depicts a drilling rig on which exemplary embodiments of the present invention may be utilized.

Referring now to FIGS. 1 through 8, exemplary embodiments of the present invention are depicted. With respect to FIGS. 1 through 8, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 8 may be described herein with respect to that reference numeral shown on other views.

FIG. 1 depicts one exemplary embodiment of a microresistivity logging while drilling tool 100 in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and logging while drilling tool 100. Exemplary embodiments of LWD tool 100 include at least one microresistivity sensor 150 and a remote return electrode 170. Drill string 30 may further include, for example, a downhole drill motor, a mud pulse telemetry system, a steering tool, and/or one or more of numerous other MWD and LWD sensors for sensing downhole characteristics of the borehole and the surrounding formation.

It will be understood by those of ordinary skill in the art that the deployment depicted on FIG. 1 is merely exemplary for purposes of describing the invention set forth herein. It will be further understood that logging tools in accordance with the present invention are not limited to use with a semisubmersible platform 12 as illustrated on FIG. 1. Measurement tool 100 is equally well suited for use with any kind of subterranean drilling operation, either offshore or onshore. While measurement tool 100 is shown coupled with drill string 30 on FIG. 1, it will also be understood that the invention is not limited to LWD embodiments, but may also be utilized in wireline microresistivity tools.

FIG. 2 depicts a portion of one exemplary embodiment of logging tool 100. As described above with respect to FIG. 1, logging tool 100 includes a microresistivity sensor 150 and a remote return electrode 170 deployed on an LWD tool body 110. While the return electrode 170 is depicted on tool body 110, it will be understood that it may also be deployed elsewhere in the drill string, e.g., in another tool in the bottom hole assembly. Moreover, while not depicted on FIG. 2, it will be understood that one or both of the sensor 150 and the return electrode 170 may be advantageously deployed, for example, in a stabilizer blade or an enlarged diameter sleeve so as to reduce the standoff distance between the sensor 150 and the borehole wall. Such deployments are commonly preferred in applications in which an oil based (nonconductive) drilling fluid is utilized.

In the exemplary embodiment depicted, a long axis of the microresistivity sensor is substantially parallel with a longitudinal axis 105 of the tool 100. Moreover, in the exemplary embodiment depicted on FIG. 2, the sensor 150 and the return electrode 170 are deployed at the same tool face (i.e., at the same circumferential position on the tool body). It will be understood that the invention is not limited in these regards.

LWD tool 100 may optionally further include an azimuth sensor 140 configured to measure the azimuth angle (toolface angle) of the microresistivity sensor 150 in substantially real time during drilling. Suitable azimuth sensors typically include one or more accelerometers, magnetometers, and/or gyroscopes and are well known in the art. It will be understood that the invention is not limited to any particular azimuth sensor configuration or even to the use of an azimuth sensor.

Figure 3A:
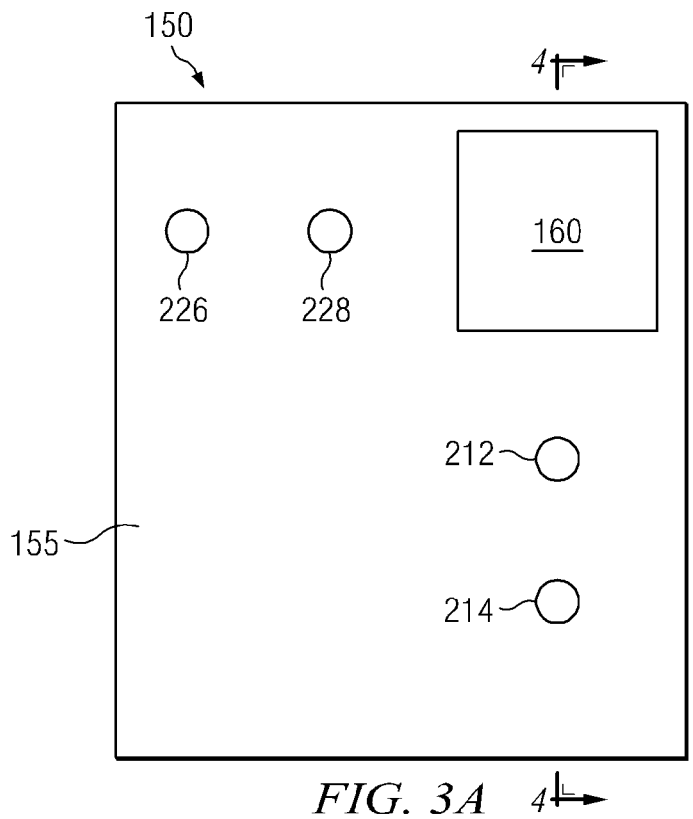
FIG. 3A depicts the exemplary microresistivity sensor embodiment shown on FIG. 2.

With continued reference to FIG. 2 and further reference now to FIG. 3A, sensor 150 includes a monopole current injection electrode 160. The sensor 150 further includes first and second spaced apart potential electrodes 212 and 214 and third and fourth spaced apart potential electrodes 226 and 228. The current injection electrode 160 is configured to inject a high frequency alternating electrical current into a subterranean formation (and may therefore be electrically connected with a high frequency alternating current supply as described in more detail below with respect to FIG. 4). In the exemplary embodiment depicted, the first and second potential electrodes 212 and 214 are axially (vertically) spaced apart from one another and from the monopole current injection electrode 160. The third and fourth potential electrodes 226 and 228 are circumferentially (horizontally) spaced apart from one another and from the monopole current injection electrode 160. In the exemplary embodiment depicted, the potential electrodes 212, 214, 226, and 228 are spaced apart and electrically isolated from the current injection electrode via conventional insulating material 155. The electrode may further include shielding, for example, as described in more detail with respect to FIGS. 7A and 7B of commonly assigned, co-pending U.S. patent application Ser. No. 12/649,885 (now U.S. Patent Publication 2011/0156711), which is fully incorporated by reference herein.

Figure 3B:
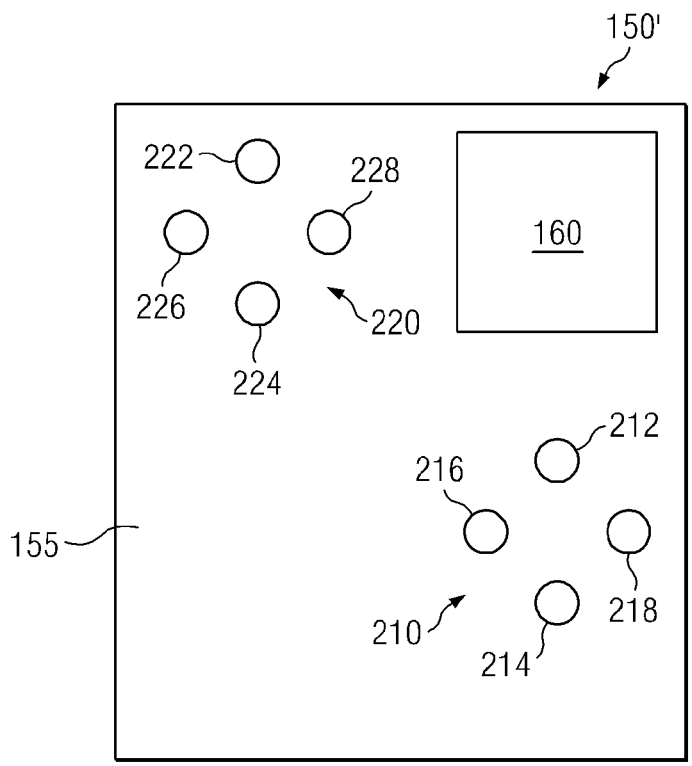
FIG. 3B depicts an alternative sensor embodiment in accordance with the present invention.

FIG. 3B depicts an alternative sensor embodiment 150' in accordance with the present invention. Sensor 150' includes a monopole current injection electrode 160 and first and second arrays 210 and 220 of potential electrodes. In the exemplary embodiment depicted, array 210 is axially spaced apart (vertically offset) from the monopole current injection electrode 160 and includes at least a first pair of axially spaced potential electrodes 212 and 214 and at least a second pair of circumferentially spaced (horizontally offset) potential electrodes 216 and 218. The second array 220 is circumferentially spaced apart (horizontally offset) from the current injection electrode 160 and also includes at least a first pair of axially spaced potential electrodes 222 and 224 and at least a second pair of circumferentially spaced potential electrodes 226 and 228. In the exemplary embodiment depicted the current injection electrode 160 is deployed axially between the return electrode 170 and the first array 210, although the invention is not limited in this regard.

Figure 4:
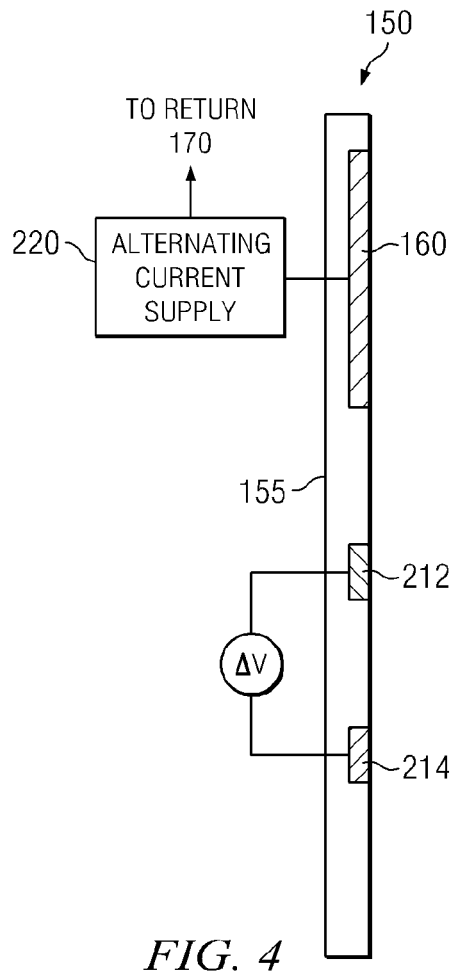
FIG. 4 depicts a longitudinal cross sectional view of the microresistivity sensor shown on FIG. 3A.

FIG. 4 depicts a longitudinal cross section of the sensor embodiment 150 depicted on FIG. 3. While not depicted on FIG. 4, the logging tool 100 further includes a controller including a high frequency alternating current supply 220, opposing poles of which are electrically connected to the current injection electrode 160 and the return electrode 170. The current supply 220 is typically configured to apply a predetermined high frequency alternating current between electrodes 160 and 170 (e.g., having a frequency in the range from about 0.1 to about 10 MHz). The controller may be further configured to measure an AC potential difference (an AC voltage) between various pairs of the potential electrodes depicted on FIG. 3 (e.g., via a conventional high impedance voltmeter) and to compute a resistivity value from the measured potential difference. Techniques for measuring the voltage drop are well known in the art and are therefore discussed no further herein.

In the exemplary embodiments sensor embodiments depicted on FIGS. 3A and 3B, the potential electrodes are spaced apart from one another in axial or circumferential (cross-axial) directions. While such configurations are commonly preferred in that they enable axial and cross-axial potential drops to be directly measured, the invention is in no way limited in this regard. The pairs of potential electrodes may likewise be angled with respect to the axial and cross-axial directions. Those of ordinary skill in the art are well versed with mathematical procedures for transforming measurements from one reference frame (coordinate system) to another.

With reference again to FIG. 2, the return electrode 170 is preferably spaced apart from the current injection electrode 160 such that the current injection electrode 160 functions as a substantially pure monopole electrode. By monopole it is meant that current injection electrode 160 emits a substantially uniform current (i.e., such that the current density is substantially equal in all directions). In contrast to a monopole source, a dipole source is influenced by the presence (the location or position) of the return electrode such that the emitted current is non-uniform (i.e., greater in one direction than in another). By referring to electrode 160 as being a substantially pure monopole it is meant that the current injection electrode 160 has a dipole impurity of less than about 5% and preferably less than about 2%.

Figure 5:
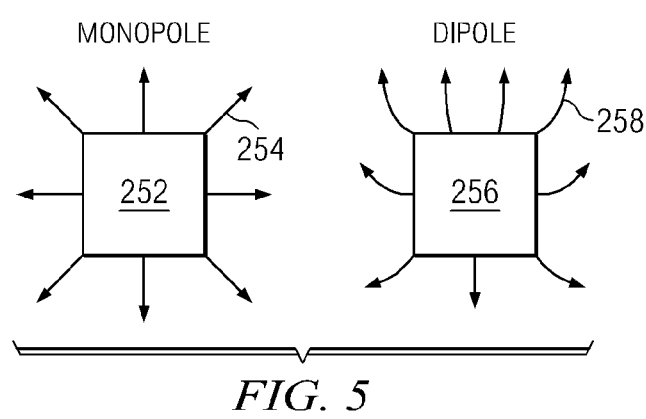
FIG. 5 depicts a schematic comparison of monopole and dipole electrodes.

This distinction between monopole and dipole electrodes is now described in more detail by way of the schematic current injection electrodes depicted on FIG. 5. As stated above (and schematically depicted on FIG. 5), a monopole current injection electrode 252 emits a substantially uniform current 254 outward from the electrode. In contrast, a dipole current injection electrode 256 emits a non-uniform current 258 outward from the electrode. In the schematic depiction shown on FIG. 5, the dipole current injection electrode is coupled with a return electrode (not shown on FIG. 5) located above the injector. The proximity of the return draws current preferentially upwards in this example.

One way to achieve a substantially pure monopole current injection electrode is to locate the return electrode 170 at electrical infinity with respect to the current injection electrode 160. In nonconductive (oil based) drilling fluid, this may be practically accomplished, for example, when a ratio of the axial separation distance/between the current injection electrode 160 and the return electrode 170 to a diameter d of the drill collar (ratio l/d) is greater than about 5. This ratio (l/d) is preferably greater than about 10. In certain embodiments, the l/d ratio may be greater than about 20, or even greater than about 50.

Location of the return electrode 170 at electrical infinity may also be practically accomplished when the ratio of the axial separation distance 1 to the separation distance k between the current injection electrode 160 and the potential electrodes 212 and 214 (ratio l/k) is greater than about 5. This ratio (l/k) is also preferably greater than about 10. In certain embodiments, the l/k ratio may be greater than about 20, or even greater than about 50.

It will be appreciated that logging tool embodiments in accordance with the present invention are not limited to embodiments including a single return electrode. For example, FIG. 6 depicts an alternative tool embodiment 100' including first and second return electrodes 170A and 170B deployed axially above and below the sensor 150. While not shown in FIG. 6, return electrodes 170A and 170B are both connected to alternating current supply 220. The use of first and second return electrodes 170A and 170B may advantageously improve the uniformity of the injected current and may therefore be preferable in certain logging operations. In the exemplary embodiment depicted the sensor 150 is deployed symmetrically between the return electrodes 170A and 170B, although the invention is not limited in this regard.

Figure 7:
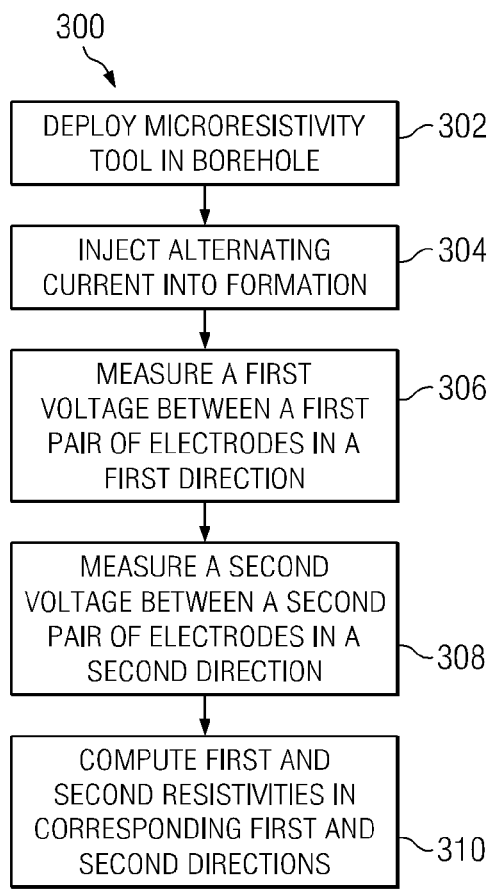
FIG. 7 depicts a flow chart of one exemplary method embodiment in accordance with the present invention.

FIG. 7 depicts one exemplary method embodiment 300 in accordance with the present invention for making microresistivity anisotropy measurements. In FIG. 7, a microresistivity tool is first deployed in a subterranean borehole at 302, preferably including a nonconductive drilling fluid. The tool includes a monopole current injection electrode and at least first and second pairs of potential electrodes, e.g., as depicted on FIG. 3A for sensor embodiment 150. At 304, an alternating current is applied between the monopole current injection electrode and a return, thereby injecting the current into the subterranean formation. At 306, a first AC voltage (potential drop) is measured between a first pair of electrodes in a corresponding first direction (e.g., between potential electrodes 212 and 214 in FIG. 3A). At 308, a second AC voltage (potential drop) is measured between a second pair of electrodes in a corresponding second direction (e.g., between potential electrodes 226 and 228 in FIG. 3A). In one exemplary embodiment of the invention, steps 306 and 308 are performed at substantially the same time. First and second resistivity values (in the corresponding first and second directions) may then be computed at 310.

Exemplary embodiments of the invention advantageously enable microresistivity anisotropy measurements to be made using a single firing of the monopole current injection electrode. Making simultaneous, or substantially simultaneous, measurements of the AC potential differences between the various pairs of electrodes enables improved azimuthal sensitivity may be achieved. It will be understood that these potential measurements need not be made at precisely the same instant in time. By substantially simultaneous (or substantially the same time) it is meant that the measurements are made at rapid enough intervals so that there is minimal tool rotation between sequential potential measurements. For example, when the tool is rotating at 120 RPM, a measurement interval of a few milliseconds tends to be sufficiently rapid so as to be considered substantially simultaneous.

The first and second resistivity values may be computed in 310, for example using the following mathematical equation:

$$R_1 = k_1 \frac{\Delta V_1}{I}$$
$$R_2 = k_2 \frac{\Delta V_2}{I}$$

Equation 1 where $R_1$ and $R_2$ represent the first and second resistivity values, $\Delta V_1$ and $\Delta V_2$ represent the AC voltages measured at 306 and 308, I represents the alternating current applied at 304, and $k_1$ and $k_2$ represent geometric factors in the first and second directions. In one preferred embodiment of the invention, the first and second directions may be axial and cross-axial (vertical and horizontal) directions such that the resistivity values may be computed in 310 as follows:

$$R_x = k_x \frac{\Delta V_x}{I}$$
$$R_z = k_z \frac{\Delta V_z}{I}$$

Equation 2 where the subscripts z and x represent the axial and cross-axial directions.

Figure 8:
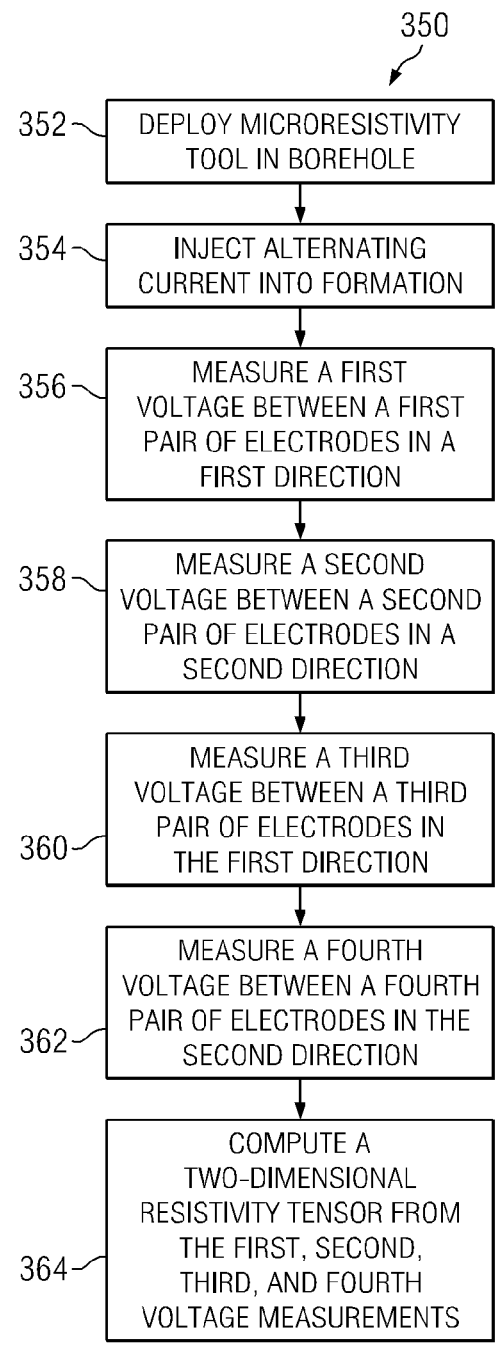
FIG. 8 depicts a flow chart of another exemplary method embodiment in accordance with the present invention.

FIG. 8 depicts another exemplary method embodiment 350 in accordance with the present invention for making microresistivity anisotropy measurements. In FIG. 8, a microresistivity tool is first deployed in a subterranean borehole, preferably including a nonconductive drilling fluid. The tool includes a monopole current injection electrode and at least first and second arrays of potential electrodes, e.g., as depicted on FIG. 3B for sensor embodiment 150'. At 354, an alternating current is applied between the monopole current injection electrode and a return, thereby injecting the current into the subterranean formation. At 356, a first AC voltage (potential drop) is measured between a first pair of electrodes in a corresponding first direction (e.g., between potential electrodes 212 and 214 in FIG. 3B). At 358, a second AC voltage is measured between a second pair of electrodes in a corresponding second direction (e.g., between potential electrodes 216 and 218). At 360, a third AC voltage is measured between a third pair of electrodes in the first direction (e.g., between potential electrodes 222 and 224 in FIG. 3B). At 362, a fourth AC voltage is measured between a fourth pair of electrodes in the second direction (e.g., between potential electrodes 226 and 228). In one exemplary embodiment of the invention, steps 356, 358, 360, and 362 are performed at substantially the same time. The AC voltage measurements acquired in 356, 358, 360, and 362 may be assembled into a two-dimensional voltage tensor and used at 364 to compute a corresponding two-dimensional resistivity tensor.

The AC voltage measurements acquired in 356, 358, 360, and 362 may be assembled into a two-dimensional voltage tensor, for example, as follows:

$$\mathbf{V} = \begin{vmatrix} \Delta V_{xx} & \Delta V_{zx} \\ \Delta V_{xz} & \Delta V_{zz} \end{vmatrix}$$

Equation 3 where $\Delta V_{zz}$ represents the potential difference measured between electrodes 212 and 214, $\Delta V_{zx}$ represents the potential difference measured between electrodes 216 and 218, $\Delta V_{xx}$ represents the potential difference measured between electrodes 222 and 224, and $\Delta V_{xz}$ represents the potential difference measured between electrodes 226 and 228. It will be understood that within this system for naming the measured voltage responses, the first index indicates the local propagation direction of the electrical current (as indicated by the offset direction between the array 210 or 220 and the current injection electrode 160) and the second index indicates the direction of the measured voltage difference (between the corresponding pair of electrodes).

The voltage tensor V may then be used to compute an apparent resistivity tensor R, by multiplying each measured element of the voltage tensor by a corresponding normalized geometric factor, for example, as follows:

$$R = \begin{vmatrix} R_{xx} & R_{zx} \\ R_{xz} & R_{zz} \end{vmatrix} = \begin{vmatrix} \dfrac{\Delta V_{xx} \cdot k_{xx}}{I} & \dfrac{\Delta V_{zx} \cdot k_{zx}}{I} \\ \dfrac{\Delta V_{xz} \cdot k_{xz}}{I} & \dfrac{\Delta V_{zz} \cdot k_{zz}}{I} \end{vmatrix} \quad \text{Equation 4}$$

where $k_{xx}$, $k_{xz}$, $K_{zx}$ and $k_{zz}$ represent the corresponding geometric factors for each of the voltage measurements and I represents the injected current at the monopole current injection electrode 160. The resistivity tensor may be further processed, for example, to obtain a formation anisotropy or to account for inclination of the borehole relative to a bedding plane. This processing is described, for example, U.S. Pat. No. 7,545,145.

With reference again to FIGS. 2 and 4, measurement tool 100 commonly includes an additional controller or a controller with additional functionality. A suitable controller typically includes a programmable processor (not shown), such as a microprocessor or a microcontroller, and may also include processor-readable or computer-readable program code embodying logic, including instructions for controlling the function of the tool. A suitable controller may be utilized, for example, to make microresistivity anisotropy measurements while drilling, e.g., to execute the controllable steps in methods 300 and 350.

Exemplary embodiments of the invention are particularly well-suited for borehole imaging applications. A suitable controller may therefore also be configured to construct LWD microresistivity images of the subterranean formation. In such imaging applications, the microresistivity measurements may be acquired and correlated with corresponding azimuth measurements (obtained, for example, from the directional sensors 140 deployed in the tool 100) while the tool rotates in the borehole. As such, the controller may therefore include instructions for temporally correlating LWD sensor measurements with sensor azimuth (toolface) measurements. The LWD sensor measurements may further be correlated with depth measurements. Borehole images may be constructed using substantially any known methodologies, for example, including conventional binning, windowing, or probability distribution algorithms. U.S. Pat. No. 5,473,158 discloses a conventional binning algorithm for constructing a borehole image. Commonly assigned U.S. Pat. No. 7,027,926 to Haugland discloses a technique for constructing a borehole image in which sensor data is convolved with a one-dimensional window function. Commonly assigned U.S. Pat. No. 7,558,675 to Sugiura discloses an image constructing technique in which sensor data is probabilistically distributed in either one or two dimensions.

A suitable controller may also optionally include other controllable components, such as other sensors, data storage devices, power supplies, timers, and the like. As described above, the controller may be disposed to be in electronic communication with the various sensors deployed in the drilling system. The controller may also optionally be disposed to communicate with other instruments in the drill string, such as telemetry systems that further communicate with the surface or a steering tool. Such communication can significantly enhance directional control while drilling. A controller may further optionally include volatile or non-volatile memory or a data storage device for downhole storage of measured currents, microresistivity values, and/or LWD images. The invention is not limited in these regards.

Although the present invention and its advantages have been described in detail, it should be understood that various changes, substitutions and alternations can be made herein without departing from the spirit and scope of the invention as defined by the appended claims.

We claim:

1. downhole microresistivity logging tool comprising:
a logging tool body;
a monopole current injection electrode configured to inject alternating electrical current into a formation;
a return electrode, the return electrode providine a return path for the electrical current injected by the monopole current injection electrode, the return electrode deployed in the tool body and spaced apart from the monopole current injection electrode;
a first pair of potential electrodes spaced apart from the monopole current injection electrode in a first direction;
a second pair of potential electrodes spaced apart from the monopole current injection electrode in a second direction; and
a controller configured to (i) apply an alternating current between the monopole current injection electrode and the return electrode and (ii) measure first and second potential differences between the corresponding first and second pairs of potential electrodes.

2. The logging, tool of claim 1, wherein a ratio of an axial separation distance between the monopole current injection electrode and the return electrode to a diameter of the logging while drilling tool body is at least ten.

3. The logging tool of claim 1, wherein a ratio of an axial separation distance between the monopole current injection electrode and the return electrode to a separation distance between the monopole current injection electrode and the potential electrodes is at least ten.

4. The logging tool of claim 1, wherein the first direction and the second direction are orthogonal to one another.

5. The logging tool of claim 4, wherein the first direction is parallel with a longitudinal axis of the tool body.

6. The logging tool of claim 1, further comprising first and second return electrodes, the first and second return electrodes providing corresponding first and second return paths for the electrical current injected by the monopole current injection electrode, the monopole current injection electrode deployed axially between the first and Second return electrodes.

7. The logging tool of claim 1, wherein the controller is configured to make substantially simultaneous measurements of the first potential difference and the second potential difference.

8. The logging tool of claim 1, wherein the controller is further configured to compute corresponding first and second formation resistivity values from the measured first and second potential differences.

9. A downhole microresistivity logging tool comprising:
a logging tool body;
a monopole current injection electrode configured to inject alternating electrical current into a formation;
a return electrode, the return electrode providing a return path for the electrical current injected by the monopole current injection electrode, the return electrode deployed in the tool body and spaced apart from the monopole current injection electrode;
a first array of potential electrodes spaced apart from the monopole current injection electrode in a first direction, the first array including at least first and second pairs of potential electrodes, the first pair of potential electrodes being, spaced apart from one another in the first direction and the second pair of potential electrodes being spaced apart from one another in the second direction;

a second array of potential electrodes spaced apart from the monopole current injection electrode in the second direction, the second array including at least third and fourth pairs of potential electrodes, the third pair of potential electrodes being spaced apart from one another in the first direction and the fourth pair of potential electrodes being spaced apart from one another in the second direction; and a controller configured to (i) apply an alternating current between the monopole current injection electrode and the return electrode and (ii) substantially simultaneously make first, second, third, and fourth AC voltage measurements using the corresponding first, second, third, and fourth pairs of potential electrodes.

10. The logging tool of claim 9, wherein a ratio of an axial separation distance between the monopole current injection electrode and the return electrode to a diameter of the logging while drilling tool body is at least ten.

11. The logging tool of claim 9, wherein a ratio of an axial separation distance between the monopole current injection electrode and the return electrode to a separation distance between the monopole current injection electrode and the potential electrodes is at least ten.

12. The logging tool of claim 9, herein the controller is further configured to compute a resistivity tensor of the formation from the AC voltage measurements.

13. The logging tool of claim 9, wherein the first direction and the second direction are orthogonal to one another, 14. The logging tool of claim 13, wherein the first direction is parallel with a longitudinal axis of the tool body.

15. A method for making microresistivity anisotropy logging measurements, the method comprising:
  (a) deploying a microresistivity logging tool in a borehole, the logging tool including (i) a monopole current injection electrode, (ii) a return electrode, the return electrode providing a return path for electrical current injected by the monopole current injection electrode, the return electrode and the monopole current injection electrode being deployed in the tool body and spaced apart from one another; and (iii), at least first and second pairs of potential electrodes, the first pair of potential electrodes being spaced apart from the monopole current injection electrode in a first direction and the second pair of potential electrodes being spaced apart from the monopole current injection electrode in a second direction;
  (b) causing an alternating electrical current to be injected into a subterranean formation at the monopole current injection electrode;
  (c) causing a first AC potential between the first pair of potential electrodes and a second AC potential between the second pair of potential electrodes to be measured substantially simultaneously; and
  (d) causing a processor to compute first and second resistivity values using the corresponding first and second AC potentials measured in (c).

16. The method of claim 15, wherein the resistivity values are computed in (d) according to the following mathematical equations:

$$R_1 = k_1 \frac{\Delta V_1}{I}; \text{ and}$$
$$R_2 = k_2 \frac{\Delta V_2}{I}$$

wherein $R_1$ and $R_2$ represent the first and second resistivity values, $\Delta V_1$ and $\Delta V_2$ represent the first and second AC potential differences measured in (c), I represents the alternating current injected in (b), and $k_1$, and $k_2$, represent geometric factors corresponding to the first and second directions.

17. The method of claim 15, wherein the first direction is substantially parallel with a longitudinal axis of the logging tool and the first and second directions are orthogonal to one another.

18. The method of claim 15, wherein the microresistivity logging tool further comprises an azimuth sensor and (c) further comprises causing the azimuth sensor to measure an azimuth angle, the method further comprising:
  (e) causing a processor to correlate the resistivity values computed in (d) with the azimuth angle measured in (c).

19. A method for making microresistivity anisotropy logging measurements, the method comprising:
  (a) deploying a microresistivity logging tool in a borehole, the logging tool including (i) a monopole current injection electrode, (ii) a return electrode, the return electrode providing a return path for electrical current injected by the monopole current injection electrode, the return electrode and the monopole current injection electrode being deployed in the tool body and spaced apart from one another; and (iii), at least first, second, third, and fourth pairs of potential electrodes, the first and second pairs of potential electrodes being spaced apart from the monopole current injection electrode in a first direction and the third and fourth pairs of potential electrodes being spaced apart from the monopole current injection electrode in a second direction;
  (b) causing an alternating electrical current to be injected into a subterranean formation at the monopole current injection electrode;
  (c) causing first, second, third, and fourth AC potentials between the corresponding first, second, third, and fourth pairs of potential electrodes to be measured substantially simultaneously;
  (d) causing a processor to process the first, second, third, and fourth AC potentials measured in (c) to obtain a voltage tensor; and
  (e) causing a processor to compute a resistivity tensor from the voltage tensor obtained in (d).

20. The method of claim 19, wherein the first direction is substantially parallel with a longitudinal axis of the logging tool and the first and second directions are orthogonal to one another.

21. The method of claim 20, wherein the voltage tensor V is obtained in (d) according to the following mathematical equation:

$$V = \begin{vmatrix} \Delta V_{xx} & \Delta V_{zx} \\ \Delta V_{xz} & \Delta V_{zz} \end{vmatrix}$$

wherein $\Delta V_{zz}$ represents the first AC potential difference, $\Delta V_{zx}$ represents the second AC potential difference, $\Delta V_{xz}$, represents the third AC potential difference, $\Delta V_{xx}$ represents the fourth AC potential difference measured in (c), and the z and x subscripts represent axial and cross-axial directions.

22. The method of claim 21, wherein the resistivity tensor R, is computed in (e) according, to the following mathematical equation:

$$R = \begin{vmatrix} R_{xx} & R_{zx} \\ R_{xz} & R_{zz} \end{vmatrix} = \begin{vmatrix} \dfrac{\Delta V_{xx} \cdot k_{xx}}{I} & \dfrac{\Delta V_{zx} \cdot k_{zx}}{I} \\ \dfrac{\Delta V_{xz} \cdot k_{xz}}{I} & \dfrac{\Delta V_{zz} \cdot k_{zz}}{I} \end{vmatrix}$$

where $k_{xx}$, $k_{xz}$, $k_{zx}$ and $k_{zz}$ represent geometric factors of the logging tool for each of the corresponding potential differences measured in (c) and I represents the alternating electrical. current injected in (b).

23. The method of claim 19, wherein the microresistivity logging tool further comprises an azimuth sensor and (c) further comprises causing the azimuth sensor to measure an azimuth angle, the method further comprising:
(f) causing a processor to correlate the resistivity tensor computed in (e) with the azimuth angle measured in (c).

* * * * *